US011802072B2

(12) United States Patent
Guo et al.

(10) Patent No.: US 11,802,072 B2
(45) Date of Patent: Oct. 31, 2023

(54) GOLD CONTAINING SILICATE GLASS

(71) Applicant: CORNING INCORPORATED, Corning, NY (US)

(72) Inventors: Xiaoju Guo, Pittsford, NY (US); Lina Ma, Corning, NY (US); Liping Xiong Smith, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 2 days.

(21) Appl. No.: 17/843,001

(22) Filed: Jun. 17, 2022

(65) Prior Publication Data
US 2022/0402804 A1 Dec. 22, 2022

Related U.S. Application Data

(63) Continuation-in-part of application No. 17/677,345, filed on Feb. 22, 2022.

(60) Provisional application No. 63/304,807, filed on Jan. 31, 2022, provisional application No. 63/212,191, filed on Jun. 18, 2021, provisional application No. 63/347,157, filed on May 31, 2022, provisional application No. 63/212,191, filed on Jun. 18, 2021.

(51) Int. Cl.
C03C 3/087 (2006.01)
C03C 4/02 (2006.01)
C03C 3/085 (2006.01)
C03C 1/04 (2006.01)

(52) U.S. Cl.
CPC ................ *C03C 3/087* (2013.01); *C03C 1/04* (2013.01); *C03C 3/085* (2013.01); *C03C 4/02* (2013.01); *C03C 2204/00* (2013.01)

(58) Field of Classification Search
CPC ......... C03C 3/083; C03C 3/085; C03C 3/087; C03C 4/02
See application file for complete search history.

(56) References Cited

U.S. PATENT DOCUMENTS

| | | | |
|---|---|---|---|
| 2,418,605 A | 4/1947 | Shepherd et al. |
| 3,524,737 A | 8/1970 | Doyle et al. |
| 3,751,238 A | 8/1973 | Grego et al. |
| 3,778,335 A | 12/1973 | Boyd |
| 3,788,865 A | 1/1974 | Busdiecker et al. |
| 4,102,664 A | 7/1978 | Dumbaugh, Jr. |
| 4,240,836 A | 12/1980 | Borrelli et al. |
| 4,298,389 A | 11/1981 | Johnson et al. |
| 4,786,305 A | 11/1988 | Ball et al. |
| 4,814,297 A | 3/1989 | Beall et al. |
| 6,333,286 B1 | 12/2001 | Kurachi et al. |
| 6,340,647 B1 | 1/2002 | Koyama et al. |
| 6,365,534 B1 | 4/2002 | Koyama et al. |
| 6,376,403 B1 | 4/2002 | Koyama et al. |
| 6,532,770 B2 | 3/2003 | Uhlik et al. |
| 6,547,980 B1 | 4/2003 | Kurachi et al. |
| 7,192,898 B2 | 3/2007 | Mori et al. |
| 7,666,511 B2 | 2/2010 | Ellison et al. |
| 8,168,313 B2 | 5/2012 | Endo et al. |
| 8,232,218 B2 | 7/2012 | Dejneka et al. |
| 9,053,734 B2 | 6/2015 | Kajita et al. |
| 9,156,725 B2 | 10/2015 | Dejneka et al. |
| 9,199,876 B2 | 12/2015 | Wang et al. |
| 9,403,716 B2 | 8/2016 | Dejneka et al. |
| 9,595,960 B2 | 3/2017 | Wilford |
| 9,701,570 B2 | 7/2017 | Mauro et al. |
| 9,790,124 B2 | 10/2017 | Dejneka et al. |
| 10,246,371 B1 | 4/2019 | Dejneka et al. |
| 10,656,454 B2 | 5/2020 | Bazemore et al. |
| 11,059,739 B2 | 7/2021 | Wolfinger et al. |
| 11,072,557 B2 | 7/2021 | Weiss et al. |
| 11,267,748 B2 | 3/2022 | Siebers et al. |
| 2003/0210535 A1 | 11/2003 | Gaides |
| 2007/0158317 A1 | 7/2007 | Brix et al. |
| 2013/0128434 A1 | 5/2013 | Yamamoto et al. |
| 2013/0136909 A1 | 5/2013 | Mauro et al. |
| 2014/0066285 A1 | 3/2014 | Beall et al. |
| 2014/0087194 A1 | 3/2014 | Dejneka et al. |

(Continued)

FOREIGN PATENT DOCUMENTS

| | | |
|---|---|---|
| CN | 113845302 A | 12/2021 |
| DE | 10141666 A1 | 3/2003 |

(Continued)

OTHER PUBLICATIONS

Hirao et al., "Crystallization effect on non-linear optical response of silicate glass and glass-ceramics containing gold nanoparticles." Journal of non-crystalline solids, vol. 290, No. 1, 2001, pp. 49-56.

Stookey, S. D. "Coloration of glass by gold, silver, and copper" Journal of the American Ceramic Society, vol. 32, No. 8, 1949, pp. 246-249.

Yazawa, et al., "Nanosized gold clusters formation in selected areas of soda-lime silicate glass." Journal of non-crystalline solids, vol. 324, No. 3, 2003, pp. 295-299.

(Continued)

*Primary Examiner* — Elizabeth A. Bolden
(74) *Attorney, Agent, or Firm* — Russell S. Magaziner

(57) ABSTRACT

A glass composition includes greater than or equal to 60 mol % and less than or equal to 85 mol % $SiO_2$; greater than or equal to 0.5 mol % and less than or equal to 20 mol % $Al_2O_3$; greater than or equal to 0 mol % and less than or equal to 15 mol % $Li_2O$; greater than or equal to 0.5 mol % and less than or equal to 25 mol % $Na_2O$; greater than or equal to 0.1 mol % and less than or equal to 20 mol % 1(20; greater than or equal to 0 mol % and less than or equal to 10 mol % CaO; greater than or equal to 0 mol % and less than or equal to 10 mol % MgO; and greater than or equal to 0.005 mol % and less than or equal to 0.5 mol % Au.

20 Claims, 9 Drawing Sheets

(56) References Cited

U.S. PATENT DOCUMENTS

| | | |
|---|---|---|
| 2014/0243183 A1 | 8/2014 | Beall et al. |
| 2014/0285956 A1 | 9/2014 | Russell-Clarke et al. |
| 2015/0064474 A1 | 3/2015 | Dejneka et al. |
| 2015/0368149 A1 | 12/2015 | Guo et al. |
| 2016/0090321 A1 | 3/2016 | Bookbinder et al. |
| 2016/0168023 A1 | 6/2016 | Baum et al. |
| 2016/0326045 A1 | 11/2016 | Li |
| 2017/0166478 A1 | 6/2017 | Gross et al. |
| 2017/0184764 A1 | 6/2017 | Matsuyuki et al. |
| 2017/0217825 A1 | 8/2017 | Hasegawa et al. |
| 2017/0291849 A1 | 10/2017 | Dejneka et al. |
| 2017/0305786 A1 | 10/2017 | Roussev et al. |
| 2017/0355636 A1 | 12/2017 | Borrelli et al. |
| 2018/0148370 A1 | 5/2018 | Baker et al. |
| 2018/0362390 A1 | 12/2018 | Claireaux et al. |
| 2019/0071345 A1 | 3/2019 | Mauro et al. |
| 2019/0177206 A1* | 6/2019 | Dejneka .................. C03C 3/091 |
| 2019/0300422 A1 | 10/2019 | Guo et al. |
| 2020/0189962 A1 | 6/2020 | Dejneka et al. |
| 2020/0377404 A1 | 12/2020 | Beall et al. |
| 2021/0155530 A1 | 5/2021 | Cui et al. |
| 2021/0155531 A1 | 5/2021 | Dejneka et al. |
| 2022/0402805 A1 | 12/2022 | Guo et al. |

FOREIGN PATENT DOCUMENTS

| | | |
|---|---|---|
| EP | 1593658 A1 | 11/2005 |
| EP | 2764320 A2 | 8/2014 |
| JP | 55-045501 A | 3/1980 |
| JP | 63-166736 A | 7/1988 |
| JP | 2000-203872 A | 7/2000 |
| RU | 2645687 C1 | 2/2018 |
| WO | 2013/099994 A1 | 7/2013 |
| WO | 2019/083937 A2 | 5/2019 |
| WO | 2019/127818 A1 | 7/2019 |

OTHER PUBLICATIONS

"Infrared Sensors Market Set To Show Upsurge With Rise In Home Automated Products—IndustryARC Analysis", 2017, Retreived from https://globenewswire.com/news-release/2017/03/21/942857/0/en/Infrared-Sensors-Market-Set-To-Show-Upsurge-With-Rise-In-Home-Automated-Products-IndustryARC-Analysis.html, Retreived on Jan. 16, 2023.

"Near Infrared Imaging Market—Global Forecast to 2020", Fast Market Research, 2022, Retreived from: http://www.sbwire.com/press-releases/just-published-near-infrared-imaging-market-global-672492.htm, Retreived on Jan. 16, 2023.

"Plexiglass Acrylic Sheets", Retrieved from: http://www.eplastics.com/Plastic/Plexiglass_Acrylic_Sheet_Infrared_Transmitting?gclid=EAIalQobChMIsL6mu7jp2AIVxRuBCh1EIQyVEAYYASABEgLs_fD_BwE, Retrieved on: Jan. 12, 2023.

Alan R. Frank, "Near-Infrared Image Sensor Targets IoT Camera Market", Mar. 2016, Retreived from: http://electronics360.globalspec.com/article/6487/near-infrared-image-sensor-targets-iot-camera-market, Retrieve on: Jan. 12, 2023.

International Search Report and Written Opinion of the International Searching Authority; PCT/US2022/033909; dated Dec. 8, 2022, 12 pages; European Patent Office.

Llordes, et al., "Tunable near-infrared and visible-light transmittance in nanocrystals-in-glass composites", Nat. Lett., vol. 500, 2013, pp. 323-327.

Sasai, Jun, and Kazuyuki Hirao. "Crystallization effect on non-linear optical response of silicate glass and glass-ceramics containing gold nanoparticles." Journal of non-crystalline solids 290, No. 1 (2001): 49-56.

* cited by examiner

GOLD CONTAINING SILICATE GLASS

This application claims the benefit of priority of U.S. application Ser. No. 17/677,345 filed on Feb. 22, 2022, U.S. Provisional Application Ser. No. 63/347,157 filed May 31, 2022, U.S. Provisional Application Ser. No. 63/304,807 filed on Jan. 31, 2022, and U.S. Provisional Application Ser. No. 63/212,191 filed on Jun. 18, 2021, the content of each of which are relied upon and incorporated herein by reference in its entirety.

FIELD

The present specification generally relates to glass compositions and glass articles and, in particular, to glass compositions that contain gold and glass articles formed therefrom.

TECHNICAL BACKGROUND

Aluminosilicate glass articles may exhibit superior ion-exchangeability and drop performance. Various industries, including the consumer electronics industry, desire colored materials with the same or similar strength and fracture toughness properties. Gold may be utilized in silicate glasses to produce colored glass articles. However, low gold solubility in the glasses may lead to the formation of gold cone defects in the glass and the raw materials utilized to add gold to a glass batch composition may have a short shelf life. The short shelf life of gold-providing raw materials may cause issues with the precise batching required to produce a desired glass composition and may introduce uncertainty to the supply chain.

Accordingly, a need exists for an alternative gold providing raw material for addition to glass batches, such as those utilized to form colored glass articles that provide the high strength and fracture toughness necessary for use in electronic devices.

SUMMARY

According to aspect (1), a glass composition is provided. The glass composition comprises: greater than or equal to 60 mol % and less than or equal to 85 mol % $SiO_2$; greater than or equal to 0.5 mol % and less than or equal to 20 mol % $Al_2O_3$; greater than or equal to 0 mol % and less than or equal to 15 mol % $Li_2O$; greater than or equal to 0.5 mol % and less than or equal to 25 mol % $Na_2O$; greater than or equal to 0.1 mol % and less than or equal to 20 mol % $K_2O$; greater than or equal to 0 mol % and less than or equal to 10 mol % CaO; greater than or equal to 0 mol % and less than or equal to 10 mol % MgO; and greater than or equal to 0.005 mol % and less than or equal to 0.5 mol % Au.

According to aspect (2), the glass composition according to the preceding aspect is provided, comprising less than or equal to 0.5 mol % $Fe_2O_3$.

According to aspect (3), the glass composition according to any of the preceding aspects is provided, comprising greater than or equal to 0.01 mol % and less than or equal to 0.5 mol % $Fe_2O_3$.

According to aspect (4), the glass composition according to any of the preceding aspects is provided, comprising greater than or equal to 61 mol % and less than or equal to 83 mol % $SiO_2$.

According to aspect (5), the glass composition according to any of the preceding aspects is provided, comprising greater than or equal to 1 mol % and less than or equal to 14 mol % $Al_2O_3$.

According to aspect (6), the glass composition according to any of the preceding aspects is provided, comprising greater than or equal to 2 mol % and less than or equal to 15 mol % $Li_2O$.

According to aspect (7), the glass composition according to any of the preceding aspects is provided, comprising greater than or equal to 5 mol % and less than or equal to 23 mol % $Na_2O$.

According to aspect (8), the glass composition according to any of the preceding aspects is provided, comprising greater than or equal to 0.2 mol % and less than or equal to 15 mol % $K_2O$.

According to aspect (9), the glass composition according to any of the preceding aspects is provided, comprising greater than or equal to 0.5 mol % and less than or equal to 9 mol % CaO.

According to aspect (10), the glass composition according to any of the preceding aspects is provided, comprising greater than or equal to 0.5 mol % and less than or equal to 7 mol % MgO.

According to aspect (11), the glass composition according to any of the preceding aspects is provided, comprising greater than or equal to 0.01 mol % and less than or equal to 0.1 mol % Au.

According to aspect (12), the glass composition according to any of the preceding aspects is provided, comprising greater than or equal to 0 mol % and less than or equal to 0.5 mol % $SnO_2$.

According to aspect (13), a glass article is provided. The glass article comprises the glass composition of any of the preceding aspects, wherein the glass article comprises an average number of Au particles of less than or equal to 5,000 particles/$mm^3$.

According to aspect (14), the glass article according to aspect (13) is provided, wherein the glass article is colored.

According to aspect (15), a method is provided. The method comprises: melting a batch to form a molten glass, wherein the batch comprises: greater than or equal to 60 mol % and less than or equal to 85 mol % $SiO_2$; greater than or equal to 0.5 mol % and less than or equal to 20 mol % $Al_2O_3$; greater than or equal to 0 mol % and less than or equal to 15 mol % $Li_2O$; greater than or equal to 0.5 mol % and less than or equal to 25 mol % $Na_2O$; greater than or equal to 0.1 mol % and less than or equal to 20 mol % $K_2O$; greater than or equal to 0 mol % and less than or equal to 10 mol % CaO; greater than or equal to 0 mol % and less than or equal to 10 mol % MgO; and greater than or equal to 0.005 mol % and less than or equal to 0.5 mol % Au, cooling the molten glass to form a glass article.

According to aspect (16), the method of aspect (15) is provided, wherein the glass article has an Au retention greater than or equal to 8% when compared to the batch.

According to aspect (17), the method of any of aspects (15) to the preceding aspect is provided, wherein the glass article has an Au retention greater than or equal to 20% when compared to the batch.

According to aspect (18), the method of any of aspects (15) to the preceding aspect is provided, wherein the glass article comprises an average number of Au particles of less than or equal to 5,000 particles/$mm^3$.

According to aspect (19), the method of any of aspects (15) to the preceding aspect is provided, wherein the glass article comprises an average number of Au particles of less than or equal to 1,000 particles/$mm^3$.

According to aspect (20), the method of any of aspects (15) to the preceding aspect is provided, wherein the glass article comprises an average number of Au particles of less than or equal to 500 particles/mm$^3$.

Additional features and advantages of the glasses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
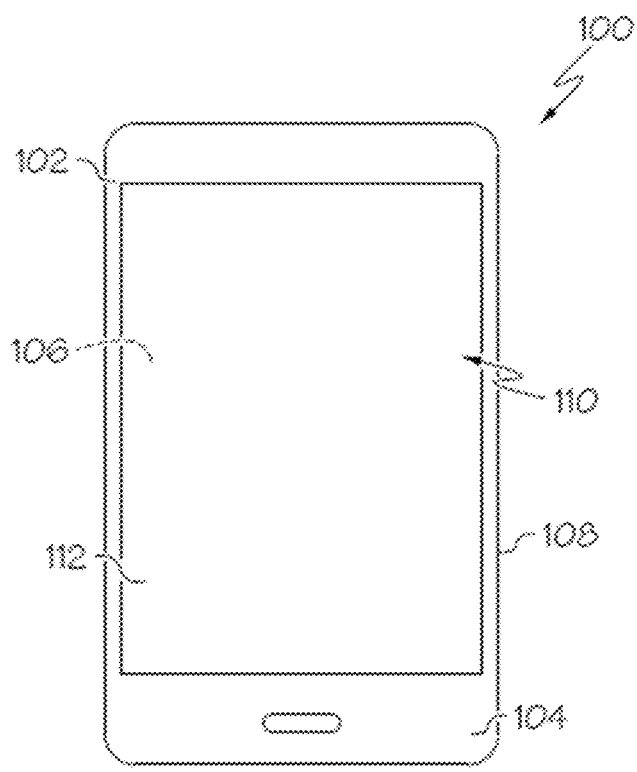
FIG. 1 is a plan view of an electronic device incorporating any of the colored glass articles according to one or more embodiments described herein.

Reference will now be made in detail to various embodiments of glass compositions suitable for use as raw materials for a glass batch composition. According to embodiments, a glass composition includes greater than or equal to 60 mol % and less than or equal to 85 mol % $SiO_2$; greater than or equal to 0.5 mol % and less than or equal to 20 mol % $Al_2O_3$; greater than or equal to 0 mol % and less than or equal to 15 mol % $Li_2O$; greater than or equal to 0.5 mol % and less than or equal to 25 mol % $Na_2O$; greater than or equal to 0.1 mol % and less than or equal to 20 mol % $K_2O$; greater than or equal to 0 mol % and less than or equal to 10 mol % CaO; greater than or equal to 0 mol % and less than or equal to 10 mol % MgO; and greater than or equal to 0.005 mol % and less than or equal to 0.5 mol % Au.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions described herein, the concentrations of constituent components in oxide form (e.g., $SiO_2$, $Al_2O_3$, and the like) are specified in mole percent (mol %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp, such as in amounts of less than 0.01 mol %, unless specified otherwise herein.

The terms "0 mol %" and "free," when used to describe the concentration and/or absence of a particular constituent component in a glass composition, means that the constituent component is not present in the glass composition.

The term "depth of compression" (DOC), as used herein, refers to the position in the article where compressive stress transitions to tensile stress.

Colorants have been added to aluminosilicate glass compositions to achieve a colored glass article having a desired color and improved mechanical properties. For example, gold may be added to glass compositions to produce a desired color. Due to the glass melting process a large amount of the gold added to the glass batch composition is lost during the glass formation process, increasing the cost of producing the glass. Additionally, variations in the melting process may produce metallic gold particulate defects in the glass which are undesired and may prevent the achievement of the desired color. The gold containing raw materials utilized to introduce gold to the glass batch composition have a short shelf-life, which may make adding the precise amount of desired gold to the batch difficult or impossible and also introduces uncertainty regarding the sufficiency and stability of the raw material supply chain.

Disclosed herein are glass compositions that mitigate the aforementioned problems by accommodating a large amount of gold in ionic form without creating an excessive number of gold particulate defects. Specifically, the glass compositions disclosed herein may be utilized as raw materials for the production of gold-containing colored glass articles without employing short shelf-life raw materials. The glass compositions may also produce a variety of colors from a single gold concentration by post-forming thermal treatment. The glass compositions described herein provide performance comparable to or better than utilizing existing gold containing raw materials, such as gold-containing compounds, in glass batch compositions, while also being easier to store due to resistance to decomposition and humidity absorption.

The glass compositions described herein may be described as silicate glass compositions and comprise Sift, $Al_2O_3$, $Na_2O$, $K_2O$, and Au. The glass compositions described herein may be utilized to form colored glass articles for electronic devices, colored glass articles for appliances, and art glass, and may be utilized as Au-containing raw materials, cullet, or frit for forming Au-containing glasses, among other applications.

Sift is the primary glass former in the glass compositions described herein and may function to stabilize the network structure of the glass articles. The concentration of Sift in the glass compositions should be sufficiently high (e.g., greater than or equal to 60 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 85 mol %) to control the melting point of the glass composition, as the melting point of pure $SiO_2$ or high $SiO_2$ glasses is undesirably high. Thus, limiting the concentration of $SiO_2$ may aid in improving the meltability of the glass composition and the formability of the colored glass article.

In embodiments, the glass composition may comprise greater than or equal to 60 mol % and less than or equal to 85 mol % $SiO_2$, such as greater than or equal to 61 mol % and less than or equal to 83 mol % $SiO_2$. In embodiments, the concentration of $SiO_2$ in the glass composition may be greater than or equal to 60 mol %, greater than or equal to 65 mol %, greater than or equal to 70 mol %, greater than or equal to 75 mol %, greater than or equal to 80 mol %, or more. In embodiments, the concentration of $SiO_2$ in the glass composition may be less than or equal to 85 mol %, less than or equal to 80 mol %, less than or equal to 75 mol %, less than or equal to 70 mol %, less than or equal to 65 mol %, or less. In embodiments, the concentration of $SiO_2$ in the glass composition may be greater than or equal to 60 mol % and less than or equal to 85 mol %, greater than or equal to 61 mol % and less than or equal to 84 mol %, greater than or equal to 62 mol % and less than or equal to 83 mol %, greater than or equal to 63 mol % and less than or equal to 82 mol %, greater than or equal to 64 mol % and less than or equal to 81 mol %, greater than or equal to 65 mol % and less than or equal to 80 mol %, greater than or equal to 66 mol % and less than or equal to 79 mol %, greater than or equal to 67 mol % and less than or equal to 78 mol %, greater than or equal to 68 mol % and less than or equal to 77 mol %, greater than or equal to 69 mol % and less than or equal to 76 mol %, greater than or equal to 70 mol % and less than or equal to 75 mol %, greater than or equal to 71 mol % and less than or equal to 74 mol %, greater than or equal to 72 mol % and less than or equal to 73 mol %, or any and all sub-ranges formed from any of these endpoints.

Like $SiO_2$, $Al_2O_3$ may also stabilize the glass network and additionally provides improved mechanical properties and chemical durability to the glass composition and the glass article. The amount of $Al_2O_3$ may also be tailored to control the viscosity of the glass composition. $Al_2O_3$ may be included such that the resultant glass composition has the desired fracture toughness. However, if the amount of $Al_2O_3$ is too high (e.g., greater than 20 mol %), the viscosity of the melt may increase, thereby diminishing the formability of the glass article. The $Al_2O_3$ also promotes ionic Au formation in the glass composition, with increasing concentration correlating to increased ionic Au formation. However, increased $Al_2O_3$ concentration was not observed to increase Au retention or reduce Au particle concentration in the glass articles.

Accordingly, in embodiments, the glass composition may comprise greater than or equal to 0.5 mol % and less than or equal to 20 mol % $Al_2O_3$, such as greater than or equal to 1 mol % and less than or equal to 14 mol % $Al_2O_3$. In embodiments, the concentration of $Al_2O_3$ in the glass composition may be greater than or equal to 1 mol %, greater than or equal to 2 mol %, greater than or equal to 5 mol %, greater than or equal to 10 mol %, greater than or equal to 15 mol %, or more. In embodiments, the concentration of $Al_2O_3$ in the glass composition may be less than or equal to 15 mol %, less than or equal to 14 mol %, less than or equal to 10 mol %, less than or equal to 5 mol %, or less. In embodiments, the concentration of $Al_2O_3$ in the glass composition may be greater than or equal to 0.5 mol % and less than or equal to 20 mol %, greater than or equal to 1 mol % and less than or equal to 19 mol %, greater than or equal to 2 mol % and less than or equal to 18 mol %, greater than or equal to 3 mol % and less than or equal to 17 mol %, greater than or equal to 4 mol % and less than or equal to 16 mol %, greater than or equal to 5 mol % and less than or equal to 15 mol %, greater than or equal to 6 mol % and less than or equal to 14 mol %, greater than or equal to 7 mol % and less than or equal to 13 mol %, greater than or equal to 8 mol % and less than or equal to 12 mol %, greater than or equal to 9 mol % and less than or equal to 11 mol %, greater than or equal to 1 mol % and less than or equal to 10 mol %, or any and all sub-ranges formed from any of these endpoints.

The glass compositions may contain alkali oxides, such as $Li_2O$, $Na_2O$, and $K_2O$. The inclusion of alkali oxides enables the ion-exchangeability of the glass articles, and also may make the glass compositions more attractive for use as raw materials for the formation of gold-containing alkali aluminosilicate glass articles.

$Li_2O$ aids in the ion-exchangeability of the glass article and also reduces the softening point of the glass composition, thereby increasing the formability of the glass articles. In addition, $Li_2O$ decreases the melting point of the glass composition, which may help improve retention of colorants in the glass. If the amount of $Li_2O$ is too high (e.g., greater than 15 mol %), the liquidus temperature may increase, thereby diminishing the manufacturability of the glass article.

In embodiments, the glass composition may comprise greater than or equal to 0 mol % and less than or equal to 15 mol % $Li_2O$, such as greater than or equal to 2 mol % and less than or equal to 15 mol % $Li_2O$. In embodiments, the concentration of $Li_2O$ in the glass composition may be greater than or equal to 0.1 mol %, greater than or equal to 0.5 mol %, greater than or equal to 1 mol %, greater than or equal to 5 mol %, greater than or equal to 10 mol %, or more. In embodiments, the concentration of $Li_2O$ in the glass composition may be less than or equal to 10 mol %, less than or equal to 5 mol %, less than or equal to 1 mol %, or less. In embodiments, the concentration of $Li_2O$ in the glass composition may be greater than or equal to 0 mol % and less than or equal to 15 mol %, greater than or equal to 0.1 mol % and less than or equal to 14 mol %, greater than or equal to 0.5 mol % and less than or equal to 13 mol %, greater than or equal to 1 mol % and less than or equal to 12 mol %, greater than or equal to 2 mol % and less than or equal to 11 mol %, greater than or equal to 3 mol % and less than or equal to 10 mol %, greater than or equal to 4 mol % and less than or equal to 9 mol %, greater than or equal to 5 mol % and less than or equal to 8 mol %, greater than or equal to 6 mol % and less than or equal to 7 mol %, or any and all sub-ranges formed from any of these endpoints.

$Na_2O$ improves diffusivity of alkali ions in the glass and thereby reduces ion-exchange time and helps achieve a desired surface compressive stress. $Na_2O$ also improves formability of the glass article. In addition, $Na_2O$ decreases the melting point of the glass composition, which may help improve colorant retention. However, if too much $Na_2O$ is added to the glass composition, the melting point may be too low.

In embodiments, the glass composition and the colored glass article may comprise greater than or equal to 0.5 mol % and less than or equal to 25 mol % $Na_2O$, such as greater than or equal to 5 mol % and less than or equal to 23 mol % $Na_2O$. In embodiments, the concentration of $Na_2O$ in the glass composition may be greater than or equal to 1 mol %, greater than or equal to 5 mol %, greater than or equal to 10 mol %, greater than or equal to 15 mol %, greater than or equal to 20 mol %, or more. In embodiments, the concentration of $Na_2O$ in the glass composition may be less than or equal to 20 mol %, less than or equal to 15 mol %, less than or equal to 10 mol %, less than or equal to 5 mol %, or less. In embodiments, the concentration of $Na_2O$ in the glass composition may be greater than or equal to 0.5 mol % and less than or equal to 25 mol %, greater than or equal to 1 mol % and less than or equal to 20 mol %, greater than or equal to 2 mol % and less than or equal to 24 mol %, greater than or equal to 3 mol % and less than or equal to 23 mol %, greater than or equal to 4 mol % and less than or equal to 22 mol %, greater than or equal to 5 mol % and less than or equal to 21 mol %, greater than or equal to 6 mol % and less than or equal to 20 mol %, greater than or equal to 7 mol % and less than or equal to 19 mol %, greater than or equal to 8 mol % and less than or equal to 18 mol %, greater than or equal to 9 mol % and less than or equal to 17 mol %, greater than or equal to 10 mol % and less than or equal to 16 mol %, greater than or equal to 11 mol % and less than or equal to 15 mol %, greater than or equal to 12 mol % and less than or equal to 14 mol %, greater than or equal to 13 mol % and less than or equal to 25 mol %, or any and all sub-ranges formed from any of these endpoints.

The inclusion of $K_2O$ in the glass composition promotes ionic Au formation in the glass articles. It was observed that greater $K_2O$ concentrations decreased the concentration of Au particles in the glass articles. $K_2O$ also promotes ion-exchange and may increase the depth of compression and decrease the melting point to improve the formability of the glass article. However, adding too much $K_2O$ may cause the surface compressive stress and melting point to be too low. Accordingly, in embodiments, the amount of $K_2O$ added to the glass composition may be limited.

In embodiments, the glass composition and the colored glass article may comprise greater than or equal to 0.1 mol % and less than or equal to 20 mol % $K_2O$, such as greater than or equal to 0.2 mol % and less than or equal to 15 mol % $K_2O$. In embodiments, the concentration of $K_2O$ in the glass composition may be greater than or equal to 0.1 mol %, greater than or equal to 0.2 mol %, greater than or equal to 0.5 mol %, or more. In embodiments, the concentration of $K_2O$ in the glass composition may be less than or equal to 15 mol %, less than or equal to 10 mol %, less than or equal to 5 mol %, or less. In embodiments, the concentration of $K_2O$ in the glass composition and the resultant colored glass article may be greater than or equal to 0.1 mol % and less than or equal to 20 mol %, greater than or equal to 0.2 mol % and less than or equal to 19 mol %, greater than or equal to 0.3 mol % and less than or equal to 18 mol %, greater than or equal to 0.4 mol % and less than or equal to 17 mol %, greater than or equal to 0.5 mol % and less than or equal to 16 mol %, greater than or equal to 1 mol % and less than or equal to 15 mol %, greater than or equal to 2 mol % and less than or equal to 14 mol %, greater than or equal to 3 mol % and less than or equal to 13 mol %, greater than or equal to 4 mol % and less than or equal to 12 mol %, greater than or equal to 5 mol % and less than or equal to 11 mol %, greater than or equal to 6 mol % and less than or equal to 10 mol %, greater than or equal to 7 mol % and less than or equal to 9 mol %, greater than or equal to 1 mol % and less than or equal to 8 mol %, or any and all sub-ranges formed from any of these endpoints.

In embodiments, the glass compositions described herein may further comprise CaO. CaO lowers the viscosity of a glass composition, which enhances the formability, the strain point and the Young's modulus, and may improve the ion-exchangeability. However, when too much CaO is added to the glass composition, the diffusivity of sodium and potassium ions in the glass composition decreases which, in turn, adversely impacts the ion-exchange performance (i.e., the ability to ion-exchange) of the resultant glass.

In embodiments, the concentration of CaO in the glass composition may be greater than or equal to 0 mol % and less than or equal to 10 mol %, such as greater than or equal to 0.5 mol % and less than or equal to 9 mol %. In embodiments, the concentration of CaO in the glass composition may be greater than or equal to 0.1 mol %, greater than or equal to 1 mol %, greater than or equal to 2 mol %, greater than or equal to 5 mol %, or more. In embodiments, the concentration of CaO in the glass composition may be less than or equal to 9 mol %, less than or equal to 5 mol %, less than or equal to 4 mol %, less than or equal to 3 mol %, less than or equal to 2 mol %, less than or equal to 1 mol %, or less. In embodiments, the concentration of CaO in the glass composition may be greater than or equal to 0 mol % and less than or equal to 10 mol %, greater than or equal to 0.1 mol % and less than or equal to 9 mol %, greater than or equal to 0.5 mol % and less than or equal to 8 mol %, greater than or equal to 1 mol % and less than or equal to 7 mol %, greater than or equal to 2 mol % and less than or equal to 6 mol %, greater than or equal to 3 mol % and less than or equal to 5 mol %, greater than or equal to 1 mol % and less than or equal to 4 mol %, or any and all sub-ranges formed from any of these endpoints. In embodiments, the glass composition may be substantially free or free of CaO.

In embodiments, the glass compositions described herein may further comprise MgO. MgO lowers the viscosity of the glass compositions, which enhances the formability, the strain point, and the Young's modulus, and may improve ion-exchangeability. However, when too much MgO is added to the glass composition, the diffusivity of sodium and potassium ions in the glass composition decreases which, in turn, adversely impacts the ion-exchange performance (i.e., the ability to ion-exchange) of the glass article.

In embodiments, the glass composition and the glass article may comprise greater than or equal to 0 mol % and less than or equal to 10 mol % MgO, such as greater than or equal to 0.5 mol % and less than or equal to 7 mol % MgO. In embodiments, the concentration of MgO in the glass composition may be greater than or equal to 0.1 mol %, greater than or equal to 1 mol %, greater than or equal to 2 mol %, greater than or equal to 5 mol %, or more. In embodiments, the concentration of MgO in the glass composition may be less than or equal to 9 mol %, less than or equal to 5 mol %, less than or equal to 4 mol %, less than or equal to 3 mol %, less than or equal to 2 mol %, less than or equal to 1 mol %, or less. In embodiments, the concentration of MgO in the glass composition may be greater than or equal to 0 mol % and less than or equal to 10 mol %, greater than or equal to 0.1 mol % and less than or equal to 9 mol %, greater than or equal to 0.5 mol % and less than or equal to 8 mol %, greater than or equal to 1 mol % and less than or equal to 7 mol %, greater than or equal to 2 mol % and less than or equal to 6 mol %, greater than or equal to 3 mol % and less than or equal to 5 mol %, greater than or equal to 1 mol % and less than or equal to 4 mol %, or any and all sub-ranges formed from any of these endpoints. In embodiments, the glass composition and the colored glass article may be substantially free or free of MgO.

As discussed above, the glass compositions described herein include Au. The Au provides the ability to act as an Au-containing raw material for the production of other Au-containing glasses and the ability of the glass to exhibit color as the result of a post-formation heat treatment. If the Au content is too low, the glass will not be capable of acting as an Au-containing raw material for the production of other Au-containing glasses and may not be capable of exhibiting the desired color as the result of post-formation heat treatment. If the Au content is too high, the incidence of Au particulate defects may increase to an unacceptable level. The glass compositions described herein have a high degree of Au solubility, enabling the high concentrations of Au described herein without the formation of excess Au particle defects. It was observed that lower Au batch concentrations correspond to increased Au retention. The Au content as utilized herein refers to the concentration of Au atoms in the glass composition, in any form.

In embodiments, the glass composition and the glass article may include greater than or equal to 0.005 mol % to less than or equal to 0.5 mol % Au, such as greater than or equal to 0.01 mol % to less than or equal to 0.1 mol %. In embodiments, the concentration of Au in the glass composition may be greater than or equal to 0.005 mol %, greater than or equal to 0.01 mol %, greater than or equal to 0.05 mol %, greater than or equal to 0.1 mol %, or more. In embodiments, the concentration of Au in the glass composition may be less than or equal to 0.5 mol %, less than or equal to 0.1 mol %, less than or equal to 0.05 mol %, less than or equal to 0.01 mol %, or less. In embodiments, the concentration of Au in the glass composition may be greater than or equal to 0.005 mol % to less than or equal to 0.5 mol %, such as greater than or equal to 0.006 mol % to less than or equal to 0.4 mol %, greater than or equal to 0.007 mol % to less than or equal to 0.3 mol %, greater than or equal to 0.008 mol % to less than or equal to 0.2 mol %, greater than or equal to 0.009 mol % to less than or equal to 0.1 mol %, greater than or equal to 0.01 mol % to less than or equal to 0.09 mol %, greater than or equal to 0.02 mol % to less than or equal to 0.08 mol %, greater than or equal to 0.03 mol % to less than or equal to 0.07 mol %, greater than or equal to 0.04 mol % to less than or equal to 0.06 mol %, greater than or equal to 0.05 mol % to less than or equal to 0.1 mol %, and any and all sub-ranges ranges formed from the foregoing endpoints.

The glass compositions and the colored glass articles described herein may further comprise $Fe_2O_3$, which may help improve gold retention. In embodiments, the concentration of $Fe_2O_3$ in the glass composition may be less than or equal to 0.5 mol %, such as greater than or equal to 0.01 mol % to less than or equal to 0.5 mol %. In embodiments, the concentration of $Fe_2O_3$ in the glass composition may be greater than or equal to 0 mol % and less than or equal to 0.5 mol %, greater than 0 mol % and less than or equal to 0.5 mol %, greater than or equal to 0.01 mol % and less than or equal to 0.5 mol %, greater than or equal to 0.02 mol % and less than or equal to 0.4 mol %, greater than or equal to 0.03 mol % and less than or equal to 0.3 mol %, greater than or equal to 0.04 mol % and less than or equal to 0.2 mol %, greater than or equal to 0.05 mol % and less than or equal to 0.1 mol %, greater than or equal to 0.06 mol % and less than or equal to 0.09 mol %, greater than or equal to 0.07 mol % and less than or equal to 0.08 mol %, or any and all sub-ranges formed from any of these endpoints. In embodiments, the glass composition and the glass article may be substantially free or free of $Fe_2O_3$.

The glass compositions and the glass articles described herein may further comprise $SnO_2$. The $SnO_2$ in the glass compositions may be added as a fining agent. In embodiments, the concentration of $SnO_2$ in the glass composition and the resultant glass article may be greater than or equal to 0 mol % and less than or equal to 0.5 mol %, greater than 0 mol % and less than or equal to 0.5 mol %, greater than or equal to 0.001 mol % and less than or equal to 0.5 mol %, greater than or equal to 0.01 mol % and less than or equal to 0.2 mol %, greater than or equal to 0 mol % and less than or equal to 0.05 mol %, or any and all sub-ranges formed from any of these endpoints. In embodiments, the glass composition and the colored glass article may be substantially free or free of $SnO_2$.

The glass compositions described herein may be formed into a glass article by any appropriate forming process. In embodiments, the glass compositions are formed into a glass article by melting a batch composition to form a molten glass, and then cooling the molten glass to form glass articles. The batch composition is defined by the desired glass composition, and may correspond to any of the glass compositions described herein. The forming process may also include forming the glass composition into the desired shape, such as roll forming the molten glass to form a thin glass sheet. In embodiments, the molten glass may be formed into cullet, such as by drigage.

The forming process results in some degree of loss of Au, which increases cost. This loss of Au may be characterized as a percentage of Au retention by determining the Au concentration in the formed glass articles and comparing to the Au concentration in the batch composition. The Au concentration in the glass articles is determined by XRF analysis. A percentage value of the Au batch composition retained in the formed glass articles may be utilized to characterize the Au retention. The glass compositions herein provide higher Au retention than other glass compositions. In embodiments, the Au retention may be greater than or equal to 8%, such as greater than or equal to 20%. In embodiments, the Au retention may be greater than or equal to 8% to less than or equal to 95%, such as greater than or equal to 10% to less than or equal to 90%, greater than or equal to 20% to less than or equal to 80%, greater than or equal to 30% to less than or equal to 70%, greater than or equal to 40% to less than or equal to 60%, greater than or equal to 25% to less than or equal to 50%, and any and all sub-ranges formed from the foregoing endpoints.

The glass articles may be characterized based on the concentration of Au particles contained therein. Generally, the presence of Au particles in the glass articles makes them less effective as Au-containing raw materials, with increased concentrations of Au particles correlating to decreased performance. As utilized herein, "Au particles" refers to metallic Au particles. In embodiments, the glass articles may include an average number of Au particles of less than or equal to 5000/mm$^3$, such as less than or equal to 4000/mm$^3$, less than or equal to 3000/mm$^3$, less than or equal to 2000/mm$^3$, less than or equal to 1000/mm$^3$, less than or equal to 500/mm$^3$, less than or equal to 400/mm$^3$, less than or equal to 300/mm$^3$, less than or equal to 200/mm$^3$, less than or equal to 100/mm$^3$, less than or equal to 90/mm$^3$, less than or equal to 80/mm$^3$, less than or equal to 70/mm$^3$, less than or equal to 60/mm$^3$, less than or equal to 50/mm$^3$, less than or equal to 40/mm$^3$, less than or equal to 30/mm$^3$, less than or equal to 20/mm$^3$, less than or equal to 10/mm$^3$, less than or equal to 1/mm$^3$, or less. In embodiments, the glass articles may be free of Au particles. The concentration of Au particles is determined with an optical microscope, with the assumption that particle distribution is homogeneous for the sake of calculating the Au concentration.

The glass articles formed from the glass compositions described herein may be subjected to a post-forming heat treatment to impart color to form a colored glass article. The color produced is a function of the glass composition, heat treatment temperature, and heat treatment time. The post-forming heat treatment produces color by allowing the growth of Au nanoparticles in the glass article, with the size and concentration of the Au nanoparticles defining the color of the colored glass article. Prior to the post-forming heat treatment, the glass articles may have a non-colored appearance.

In embodiments, the glass compositions described herein are ion-exchangeable to facilitate strengthening the glass article made from the glass compositions. In typical ion-exchange processes, smaller metal ions in the glass compositions are replaced or "exchanged" with larger metal ions of the same valence within a layer that is close to the outer surface of the colored glass article made from the glass composition. The replacement of smaller ions with larger ions creates a compressive stress within the layer of the colored glass article made from the glass composition. In embodiments, the metal ions are monovalent metal ions (e.g., Li$^+$, Na$^+$, K$^+$, and the like), and ion-exchange is accomplished by immersing the glass article made from the glass composition in a bath comprising at least one molten salt of the larger metal ion that is to replace the smaller metal ion in the glass article. Alternatively, other monovalent ions such as Ag$^+$, Tl$^+$, Cu$^+$, and the like may be exchanged for monovalent ions. The ion-exchange process or processes that are used to strengthen the glass article made from the glass composition may include contacting the glass article with an ion-exchange medium. In embodiments, the ion-exchange medium may be a molten salt bath. For example, the ion-exchange process may include, but is not limited to, immersion in a single bath or multiple baths of like or different compositions with optional washing and/or annealing steps between immersions.

The development of this surface compression layer is beneficial for achieving a better crack resistance and higher flexural strength compared to non-ion-exchanged materials. The surface compression layer has a higher concentration of the ions exchanged into the colored glass article in comparison to the concentration of the ions exchanged into the glass article for the body (i.e., the area not including the surface compression) of the glass article.

Figure 2:
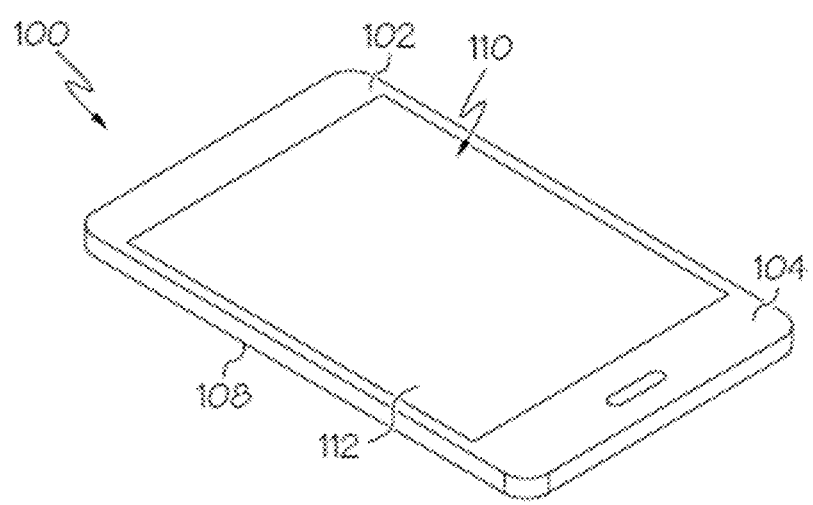
FIG. 2 is a perspective view of the electronic device of FIG. 1.

In addition to use as Au-containing raw materials, the glass articles described herein may be used for a variety of applications including, for example, back cover applications in consumer or commercial electronic devices such as smartphones, tablet computers, personal computers, ultra-books, televisions, and cameras. An exemplary article incorporating any of the colored glass articles disclosed herein is shown in FIGS. 1 and 2. Specifically, FIGS. 1 and 2 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of housing 102, such as the back 106, may include any of the colored glass articles disclosed herein.

EXAMPLES

In order that various embodiments be more readily understood, reference is made to the following examples, which illustrate various embodiments of the colored glass articles described herein.

Exemplary batch compositions were melted and formed into thin sheets by a rolling process. The glass sheets were then annealed at 400° C. Table 1 shows the batch compositions (in terms of mol %), the concentration of Au in the batch composition in wt %, the concentration of Au in the formed exemplary glass articles as analyzed by XRF in wt %, the calculated Au retention, and the average number of Au particles per mm$^3$. Examples 1-18 were produced with a two-step melting process that included melting at 1500° C. for 6 hours, drigage to cullet, remelting at 1600° C. for 16 hours, rolling into thin sheets, and then annealing at 400° C. Examples 19-42 were produced with a single step melting process that included melting at 1500° C. for 4 hours, ramping to 1600° C. and holding for 16 hours, rolling into thin sheets, and then annealing at 400° C.

TABLE I

| Example | 1 | 2 | 3 | 4 | 5 | 6 | 7 | 8 |
|---|---|---|---|---|---|---|---|---|
| SiO$_2$ | 72.7 | 72.7 | 72.7 | 72.7 | 72.7 | 72.7 | 72.7 | 74.7 |
| Al$_2$O$_3$ | 1 | 1 | 1 | 1 | 1 | 1 | 1 | 1 |
| Li$_2$O | 2.5 | 5 | 5 | 5 | 10 | 15 | 5 | 5 |
| Na$_2$O | 7.5 | 15 | 15 | 15 | 10 | 5 | 15 | 15 |

TABLE I-continued

| | | | | | | | | |
|---|---|---|---|---|---|---|---|---|
| K₂O | 0.2 | 0.2 | 0.2 | 0.2 | 0.2 | 0.2 | 0.2 | 0.2 |
| CaO | 9 | 5 | 3 | 1 | 3 | 3 | 0 | 0 |
| MgO | 7 | 1 | 3 | 5 | 3 | 3 | 6 | 4 |
| Fe₂O₃ | 0.05 | 0.05 | 0.05 | 0.05 | 0.05 | 0.05 | 0.05 | 0.05 |
| Au | 0.05 | 0.05 | 0.05 | 0.05 | 0.05 | 0.05 | 0.05 | 0.05 |
| SnO₂ | 0.05 | 0.05 | 0.05 | 0.05 | 0.05 | 0.05 | 0.05 | 0.05 |
| Au Batched (wt %) | 0.169 | 0.166 | 0.167 | 0.168 | 0.172 | 0.177 | 0.169 | 0.168 |
| Au XRF (wt %) | 0.055 | 0.052 | 0.056 | 0.063 | 0.050 | 0.049 | 0.055 | 0.067 |
| Au Retention | 33% | 31% | 33% | 38% | 29% | 28% | 32% | 40% |
| Average # of Particles/mm³ | 4034 | 123 | 56 | 362 | 420 | 4666 | 390 | 1884 |
| STDEV | 647 | 163 | 23 | 59 | 81 | 1191 | 57 | 73 |

| Example | 9 | 10 | 11 | 12 | 13 | 14 | 15 | 16 |
|---|---|---|---|---|---|---|---|---|
| SiO₂ | 77.7 | 77.7 | 77.7 | 77.7 | 77.7 | 77.7 | 77.7 | 80.7 |
| Al₂O₃ | 1 | 1 | 1 | 1 | 1 | 1 | 6 | 3 |
| Li₂O | 5 | 0 | 0 | 0 | 0 | 0 | 0 | 0 |
| Na₂O | 15 | 20 | 17 | 15 | 17 | 17 | 15 | 15 |
| K₂O | 0.2 | 0.2 | 3.2 | 5.2 | 3.2 | 3.2 | 0.2 | 0.2 |
| CaO | 0 | 0 | 0 | 0 | 0 | 0 | 0 | 0 |
| MgO | 1 | 1 | 1 | 1 | 1 | 1 | 1 | 1 |
| Fe₂O₃ | 0.05 | 0.05 | 0.05 | 0.05 | 0.05 | 0.1 | 0.05 | 0.05 |
| Au | 0.05 | 0.05 | 0.05 | 0.05 | 0.1 | 0.1 | 0.05 | 0.05 |
| SnO₂ | 0.05 | 0.05 | 0.05 | 0.05 | 0.1 | 0.05 | 0.05 | 0.05 |
| Au Batched (wt %) | 0.166 | 0.161 | 0.159 | 0.157 | 0.317 | 0.317 | 0.156 | 0.160 |
| Au XRF (wt %) | 0.085 | 0.050 | 0.074 | 0.060 | 0.079 | 0.076 | 0.034 | 0.049 |
| Au Retention | 51% | 31% | 47% | 38% | 25% | 24% | 22% | 31% |
| Average # of Particles/mm³ | 1132 | 2 | 11 | 1 | 178 | 24 | 7 | 18 |
| STDEV | 225 | 4 | 4 | 1 | 100 | 16 | 4 | 2 |

| Example | 17 | 18 | 19 | 20 | 21 | 22 | 23 | 24 |
|---|---|---|---|---|---|---|---|---|
| SiO₂ | 77.7 | 77.7 | 72.8 | 72.8 | 69.8 | 61.8 | 78.8 | 82.8 |
| Al₂O₃ | 1 | 1 | 6 | 11 | 10 | 14 | 8 | 6 |
| Li₂O | 0 | 0 | 0 | 0 | 0 | 0 | 0 | 0 |
| Na₂O | 20 | 20 | 20 | 15 | 19 | 23 | 12 | 10 |
| K₂O | 0.2 | 0.2 | 0.2 | 0.2 | 0.2 | 0.2 | 0.2 | 0.2 |
| CaO | 0 | 0 | 0.5 | 0.5 | 0.5 | 0.5 | 0.5 | 0.5 |
| MgO | 1 | 1 | 0.5 | 0.5 | 0.5 | 0.5 | 0.5 | 0.5 |
| Fe₂O₃ | 0.05 | 0.1 | 0.1 | 0.1 | 0.1 | 0.1 | 0.1 | 0.1 |
| Au | 0.1 | 0.1 | 0.08 | 0.08 | 0.08 | 0.08 | 0.08 | 0.08 |
| SnO₂ | 0.1 | 0.05 | 0.05 | 0.05 | 0.05 | 0.05 | 0.05 | 0.05 |
| Au Batched (wt %) | 0.322 | 0.322 | 0.249 | 0.241 | 0.242 | 0.236 | 0.246 | 0.249 |
| Au XRF (wt %) | 0.066 | 0.054 | 0.049 | 0.026 | 0.031 | 0.018 | 0.029 | 0.030 |
| Au Retention | 21% | 17% | 20% | 11% | 13% | 8% | 12% | 12% |
| Average # of Particles/mm³ | 1 | 0 | 2 | 117 | 4 | 1 | 73 | 545 |
| STDEV | 1 | 0 | 1 | 76 | 1 | 1 | 29 | 65 |

| Example | 25 | 26 | 27 | 28 | 29 | 30 | 31 | 32 |
|---|---|---|---|---|---|---|---|---|
| SiO₂ | 74.8 | 72.8 | 61.8 | 77.8 | 77.8 | 77.8 | 77.8 | 77.8 |
| Al₂O₃ | 14 | 11 | 14 | 1 | 1 | 1 | 1 | 1 |
| Li₂O | 0 | 0 | 0 | 0 | 0 | 0 | 0 | 0 |
| Na₂O | 10 | 15 | 23 | 17 | 17 | 17 | 17 | 15 |
| K₂O | 0.2 | 0.2 | 0.2 | 3.2 | 3.2 | 3.2 | 3.2 | 5.2 |
| CaO | 0.5 | 0.5 | 0.5 | 0 | 0 | 0 | 0 | 0 |
| MgO | 0.5 | 0.5 | 0.5 | 1 | 1 | 1 | 1 | 1 |
| Fe₂O₃ | 0.1 | 0.1 | 0.1 | 0.05 | 0.05 | 0.05 | 0.05 | 0.05 |
| Au | 0.08 | 0.08 | 0.08 | 0.05 | 0.05 | 0.03 | 0.05 | 0.05 |
| SnO₂ | 0.05 | 0 | 0 | 0.05 | 0 | 0 | 0 | 0.05 |
| Au Batched (wt %) | | 0.241 | 0.236 | 0.159 | 0.159 | 0.096 | 0.159 | 0.157 |
| Au XRF (wt %) | | 0.025 | 0.019 | 0.102 | 0.076 | 0.070 | 0.067 | 0.090 |
| Au Retention | | 11% | 8% | 64% | 48% | 73% | 42% | 58% |
| Average # of Particles/mm³ | | 52 | 3 | 477 | 380 | 2 | 19 | 29 |
| STDEV | | 18 | 2 | 276 | 426 | 0 | 5 | 8 |

TABLE I-continued

| Example | 33 | 34 | 35 | 36 | 37 | 38 | 39 | 40 |
|---|---|---|---|---|---|---|---|---|
| $SiO_2$ | 77.8 | 77.8 | 77.8 | 77.8 | 77.8 | 77.8 | 77.8 | 77.8 |
| $Al_2O_3$ | 1 | 1 | 1 | 3 | 1 | 1 | 1 | 1 |
| $Li_2O$ | 0 | 0 | 0 | 0 | 0 | 0 | 0 | 0 |
| $Na_2O$ | 15 | 15 | 15 | 15 | 20 | 10 | 5.2 | 15 |
| $K_2O$ | 5.2 | 5.2 | 5.2 | 3.2 | 0.2 | 10.2 | 15 | 5.2 |
| CaO | 0 | 0 | 0 | 0 | 0 | 0 | 0 | 0 |
| MgO | 1 | 1 | 1 | 1 | 1 | 1 | 1 | 1 |
| $Fe_2O_3$ | 0.05 | 0.05 | 0.05 | 0.05 | 0.05 | 0.05 | 0.05 | 0.05 |
| Au | 0.05 | 0.03 | 0.05 | 0.05 | 0.03 | 0.03 | 0.03 | 0.01 |
| $SnO_2$ | 0 | 0 | 0 | 0 | 0 | 0 | 0 | 0 |
| Au Batched (wt %) | 0.157 | 0.095 | 0.157 | 0.157 | 0.097 | 0.092 | 0.090 | 0.032 |
| Au XRF (wt %) | 0.081 | 0.090 | 0.106 | 0.066 | 0.062 |  |  | 0.026 |
| Au Retention | 52% | 95% | 68% | 42% | 64% |  |  | 84% |
| Average # of Particles/mm³ | 230 | 2 | 3 | 44 | 342 | 42 | 36 | 0 |
| STDEV | 138 | 0 | 2 | 25 | 111 | 5 | 10 | 0 |

| Example | 41 | 42 |
|---|---|---|
| $SiO_2$ | 77.8 | 77.8 |
| $Al_2O_3$ | 1 | 1 |
| $Li_2O$ | 0 | 0 |
| $Na_2O$ | 15 | 15 |
| $K_2O$ | 5.2 | 5.2 |
| CaO | 0 | 0 |
| MgO | 1 | 1 |
| $Fe_2O_3$ | 0.05 | 0.05 |
| Au | 0.03 | 0.06 |
| $SnO_2$ | 0 | 0 |
| Au Batched (wt %) | 0.095 | 0.189 |
| Au XRF (wt %) | 0.041 | 0.075 |
| Au Retention | 44% | 40% |
| Average # of Particles/mm³ | 3 | 221 |
| STDEV | 1 | 36 |

As shown in Table I, a single step melting process generally exhibits less Au loss (higher Au retention) than a two-step melting process.

Figure 3:
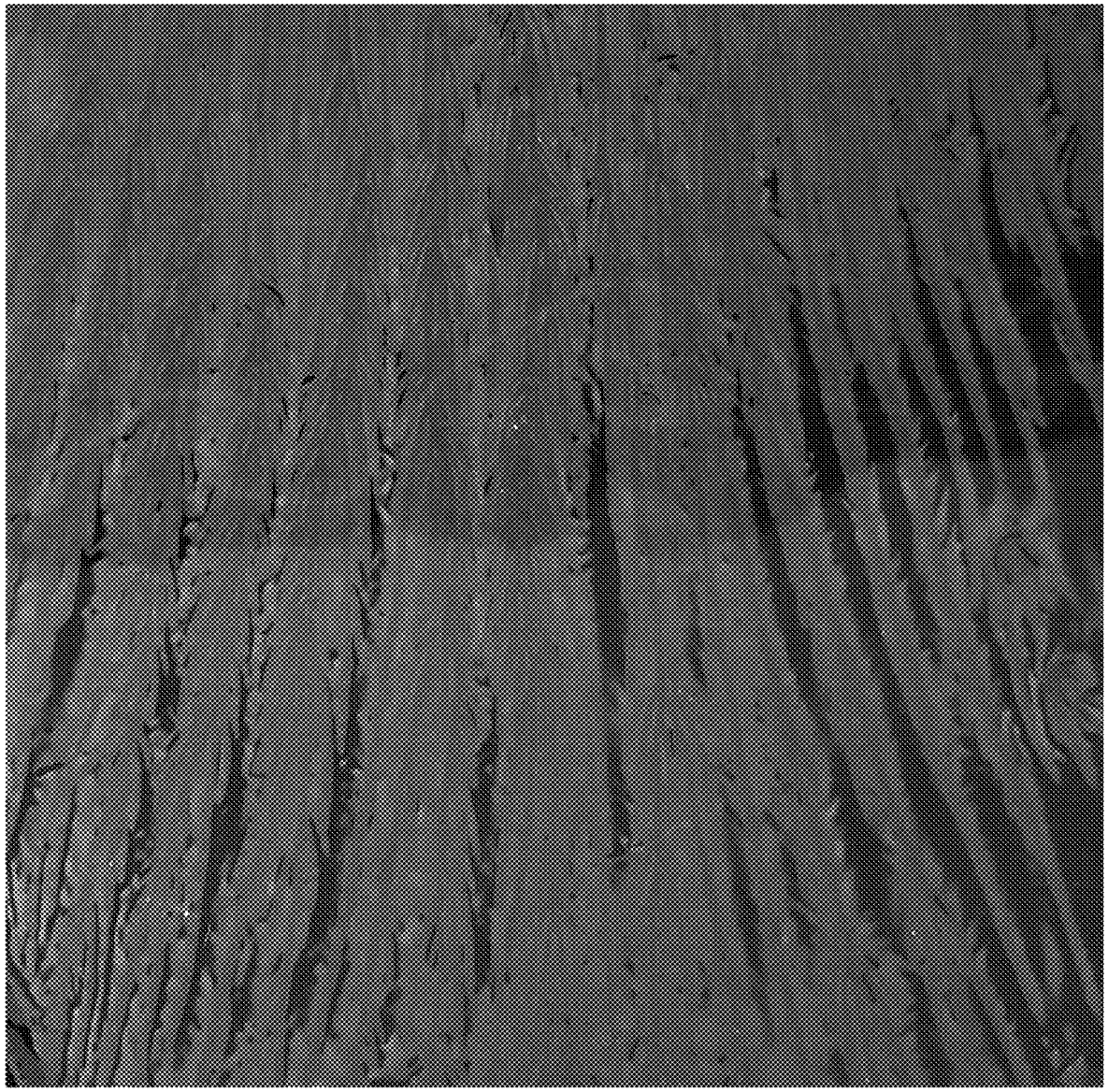
FIG. 3 is a photograph of a glass article showing color patterns, according to an embodiment.

The exemplary glass articles may have color patterns form on the glass surface due to different cooling rates, as shown in FIG. 3. The colored and non-colored areas were analyzed by EDS and SEM, and no difference in morphology or chemical composition was detected between the colored and non-colored areas.

Figure 4:
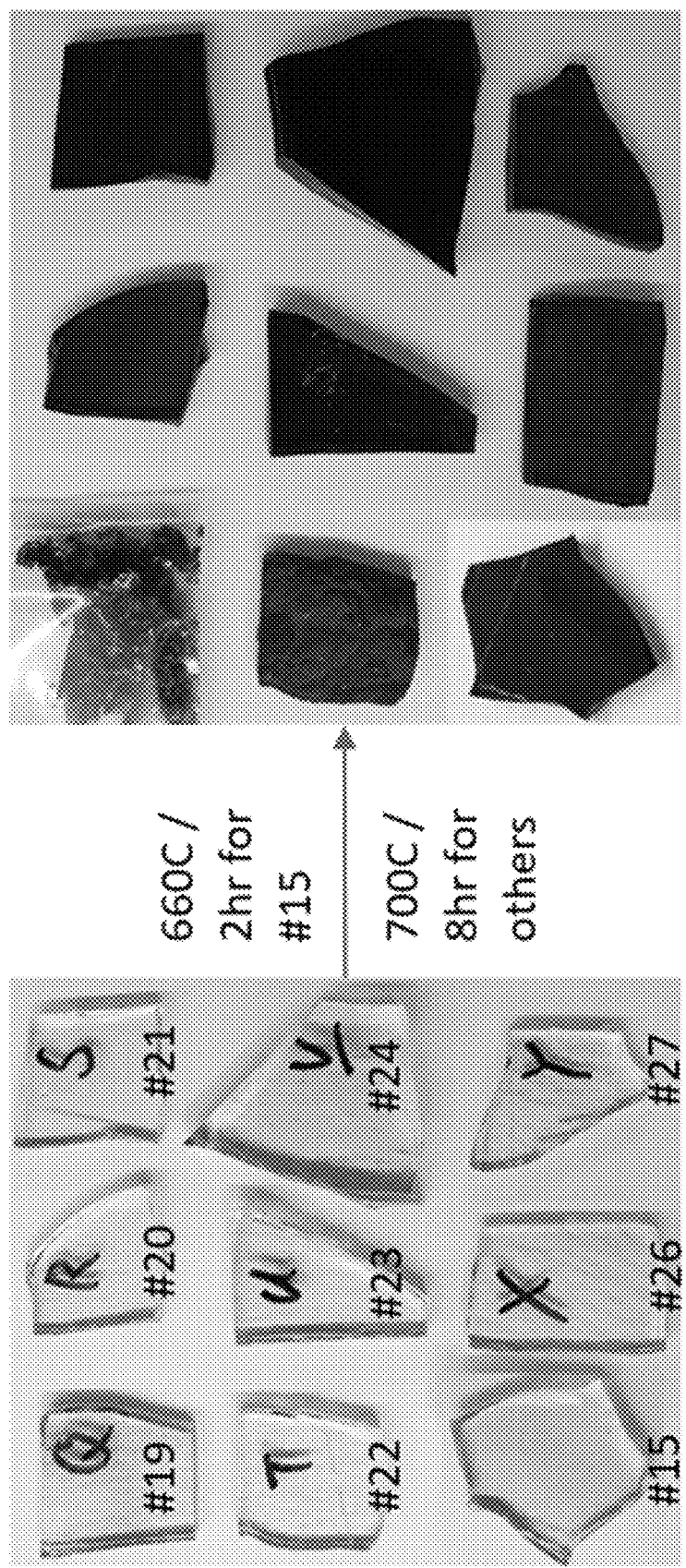
FIG. 4 is a photograph of various exemplary glass articles before and after a post-forming heat treatment to produce colored glass articles.

Clear non-colored samples of Examples 15, 19-24, 26, and 27 were subjected to a post-forming heat treatment to produce ruby-colored glass articles. Example 15 was heat treated at 660° C. for 2 hours, and Examples 19-24, 26, and 27 were heat treated at 700° C. for 8 hours. The samples before and after the heat treatment are shown in FIG. 4.

Figure 5:
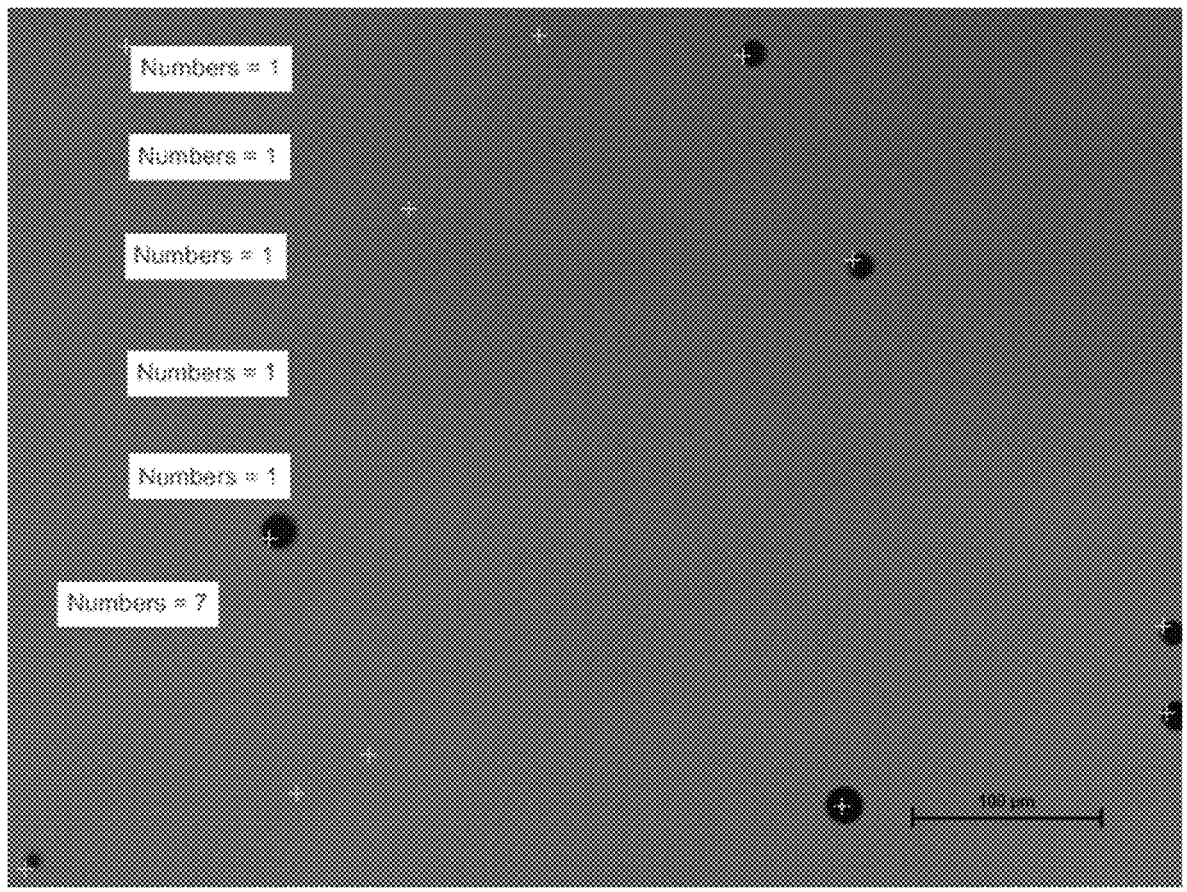
FIG. 5 is an optical microscope image of an exemplary glass article, of the type utilized to determine Au particle concentration.

FIG. 5 is a representative optical microscopy image of the type utilized to determine the Au particle concentration.

Figure 6:
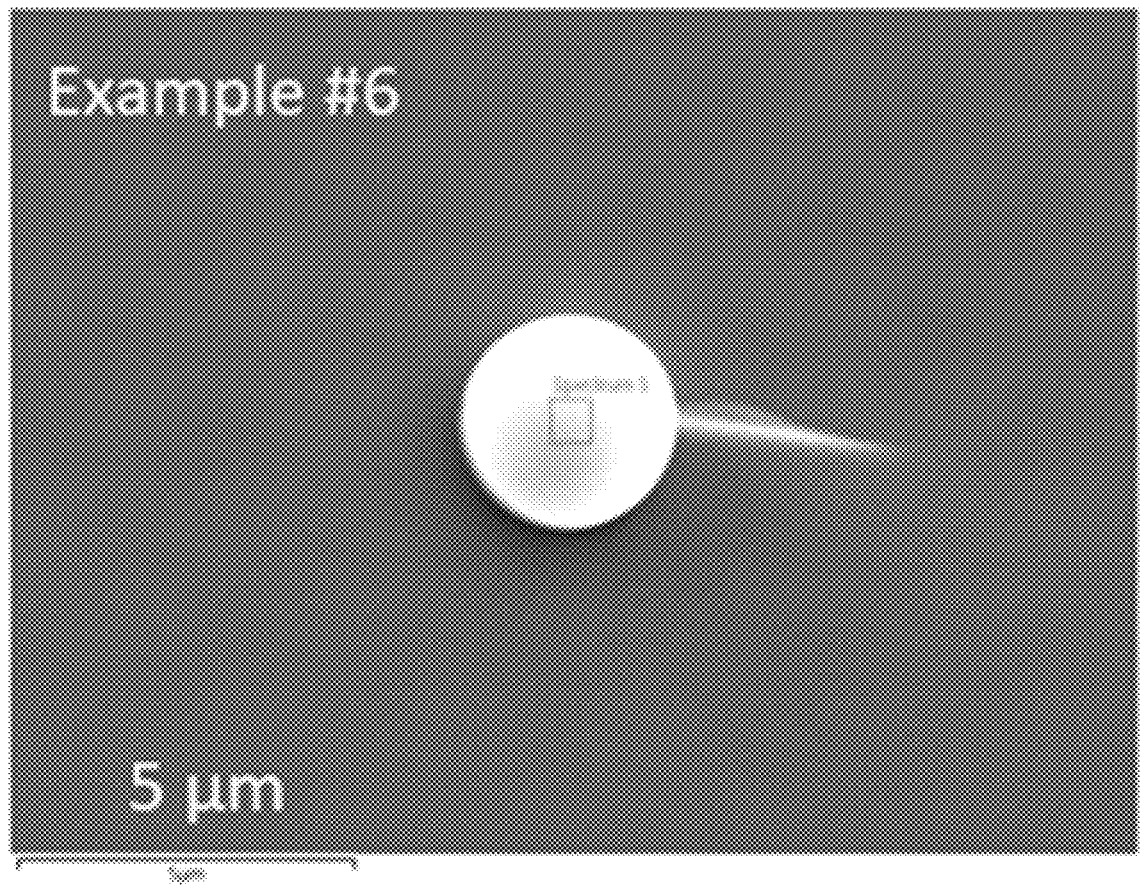
FIG. 6 is an SEM image of an Au particle in a glass article according to an embodiment.
Figure 7:
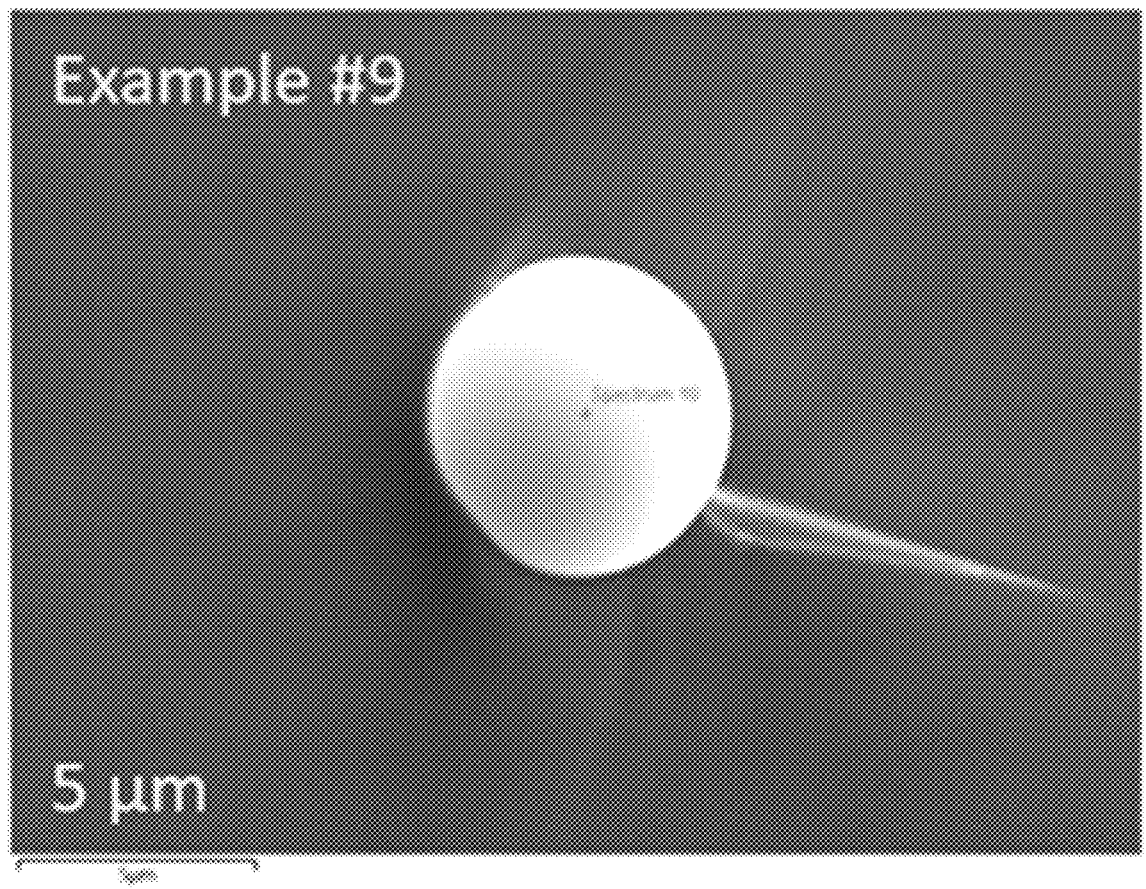
FIG. 7 is an SEM image of an Au particle in a glass article according to an embodiment.
Figure 8:
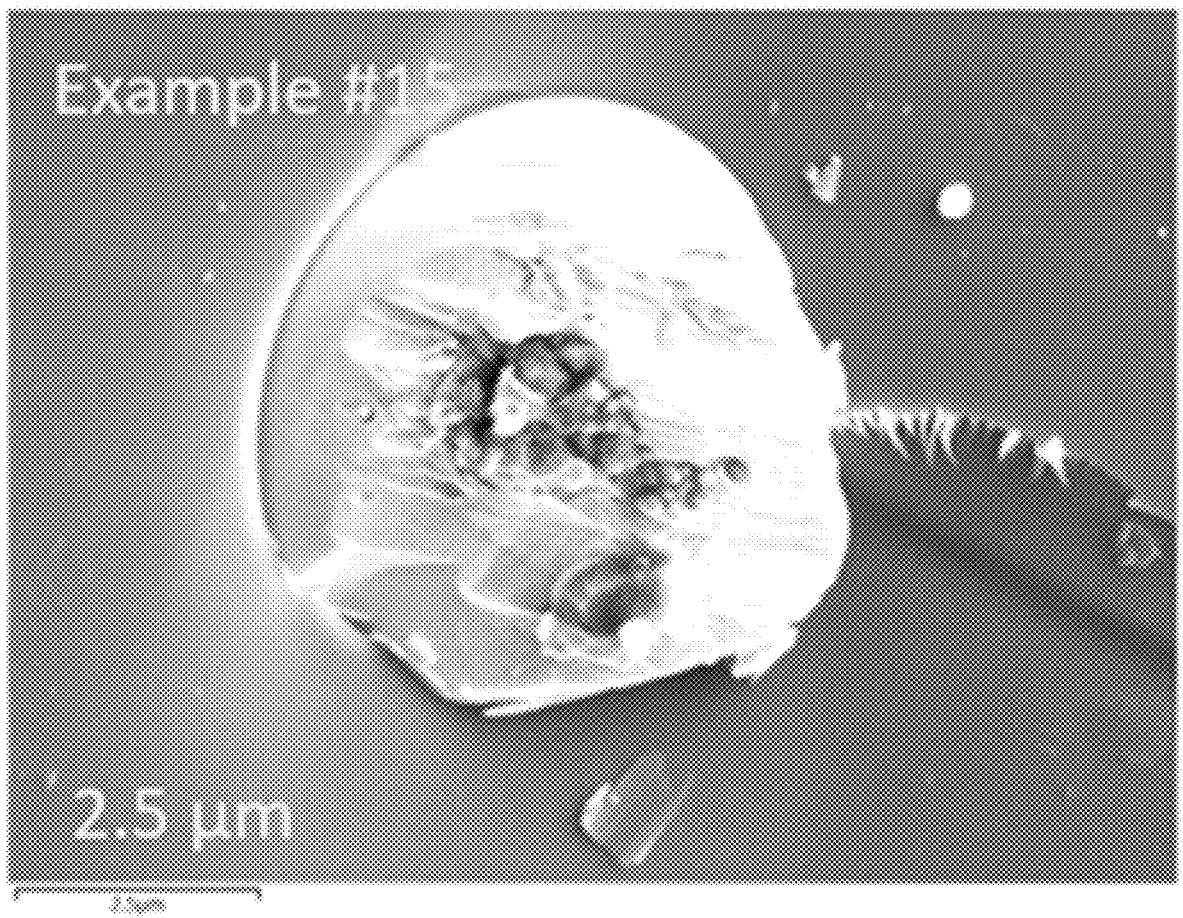
FIG. 8 is an SEM image of an Au particle in a glass article according to an embodiment.

FIG. 6 is an SEM image of an Au particle in a glass article according to Example 6. FIG. 7 is an SEM image of an Au particle in a glass article according to Example 9. FIG. 8 is an SEM image of an Au particle in a glass article according to Example 15. EDS analysis confirmed that the particles observed in each example were metallic Au.

Figure 9:
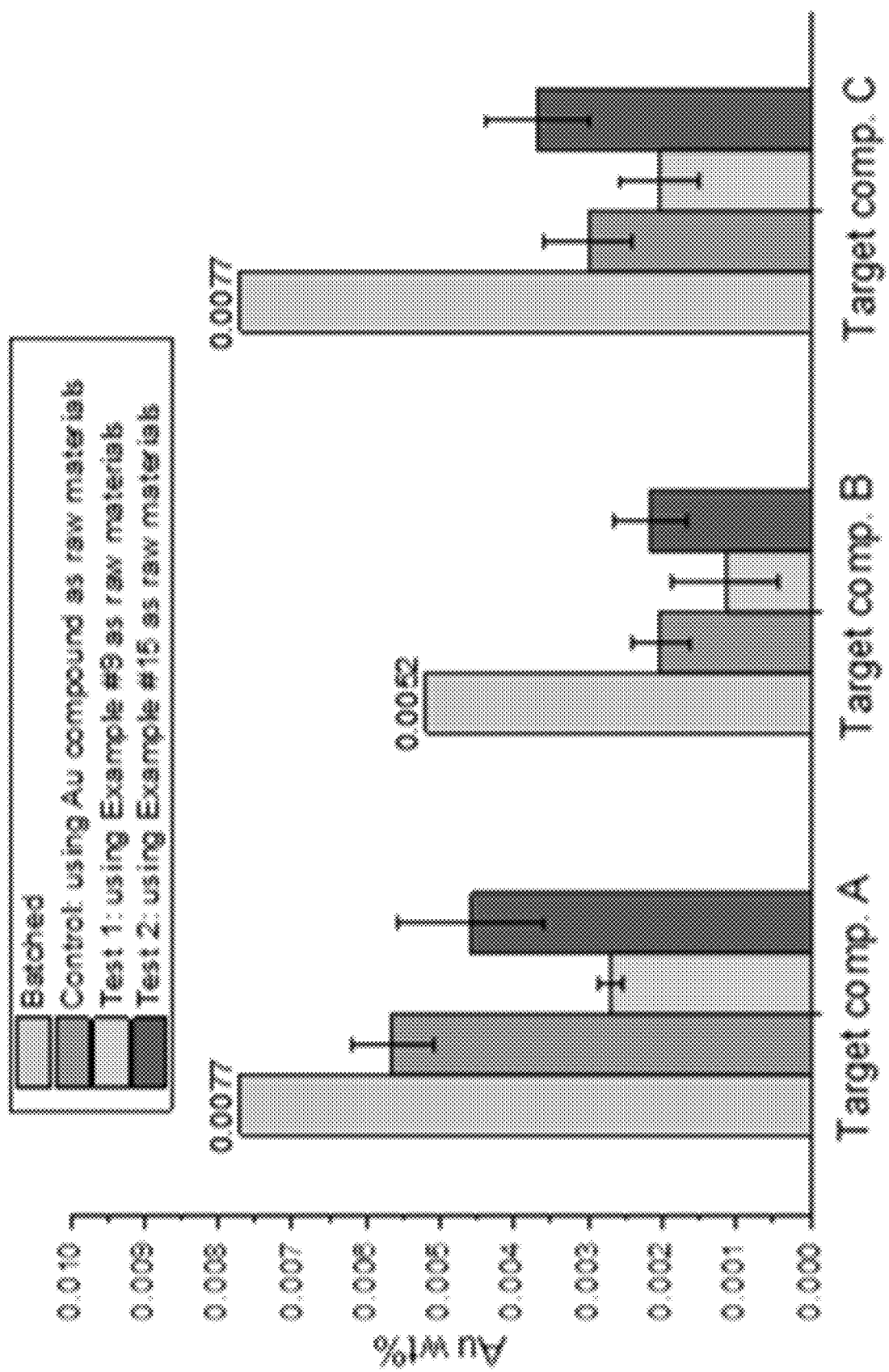
FIG. 9 is a chart of Au concentration for a control melt utilizing Au compound raw materials, and two melts utilizing exemplary glass compositions for various target compositions.
Figure 10:
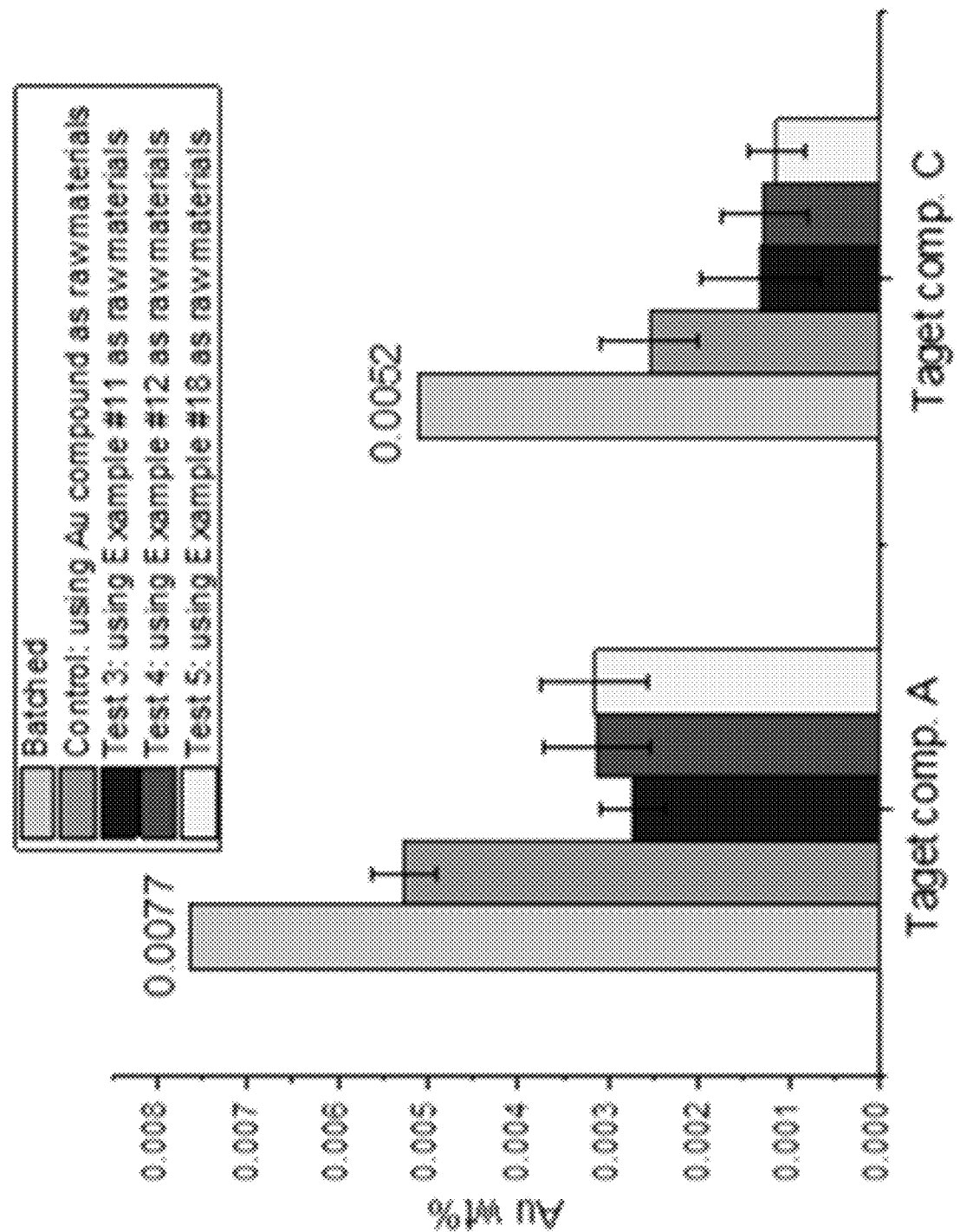
FIG. 10 is a chart of Au concentration for a control melt utilizing Au compound raw materials, and three melts utilizing exemplary glass compositions for various target compositions.

To determine the effectiveness of the exemplary glass articles as Au-containing raw materials for the formation of other Au-containing glass materials, target compositions were melted utilizing both conventional Au raw materials and the exemplary glass articles as Au-containing raw materials. As shown in FIGS. 9 and 10, the exemplary glass articles produced comparable or better Au retention than the Au compound raw materials. The gold particle concentration was also observed to impact the Au retention, with glasses with lower Au particle concentration producing higher Au retention.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass composition comprising:
   greater than or equal to 60 mol % and less than or equal to 85 mol % $SiO_2$;
   greater than or equal to 0.5 mol % and less than or equal to 20 mol % $Al_2O_3$;
   greater than or equal to 0 mol % and less than or equal to 15 mol % $Li_2O$;
   greater than or equal to 0.5 mol % and less than or equal to 25 mol % $Na_2O$;
   greater than or equal to 0.1 mol % and less than or equal to 20 mol % $K_2O$;
   greater than or equal to 0-2 mol % and less than or equal to 10 mol % CaO;
   greater than or equal to 0 mol % and less than or equal to 10 mol % MgO;
   greater than or equal to 0.01 mol % and less than or equal to 0.5 mol % $Fe_2O_3$; and Au, wherein the concentration of Au in the glass composition is less than or equal to 0.5 mol %.

2. The glass composition of claim 1, comprising greater than or equal to 61 mol % and less than or equal to 83 mol % $SiO_2$.

3. The glass composition of claim 1, comprising greater than or equal to 1 mol % and less than or equal to 14 mol % $Al_2O_3$.

4. The glass composition of claim 1, comprising greater than or equal to 2 mol % and less than or equal to 15 mol % $Li_2O$.

5. The glass composition of claim 1, comprising greater than or equal to 1 mol % and less than or equal to 12 mol % $Li_2O$.

6. The glass composition of claim 1, comprising greater than or equal to 2 mol % and less than or equal to 11 mol % $Li_2O$.

7. The glass composition of claim 1, comprising greater than or equal to 5 mol % and less than or equal to 23 mol % $Na_2O$.

8. The glass composition of claim 1, comprising greater than or equal to 0.2 mol % and less than or equal to 15 mol % $K_2O$.

9. The glass composition of claim 1, comprising greater than or equal to 3 mol % and less than or equal to 9 mol % CaO.

10. The glass composition of claim 1, comprising greater than or equal to 0.5 mol % and less than or equal to 7 mol % MgO.

11. The glass composition of claim 1, comprising greater than or equal to 0 mol % and less than or equal to 0.5 mol % $SnO_2$.

12. The glass composition of claim 1, comprising greater than or equal to 0.01 mol % and less than or equal to 0.1 mol % Au.

13. A glass article, comprising the glass composition of claim 1, wherein the glass article comprises an average number of Au particles of less than or equal to 5,000 particles/mm$^3$.

14. The glass article of claim 13, wherein the glass article is colored.

15. A method of forming a glass article, comprising:
melting a batch to form a molten glass, wherein the batch comprises:
greater than or equal to 60 mol % and less than or equal to 85 mol % $SiO_2$;
greater than or equal to 0.5 mol % and less than or equal to 20 mol % $Al_2O_3$;
greater than or equal to 0 mol % and less than or equal to 15 mol % $Li_2O$;
greater than or equal to 0.5 mol % and less than or equal to 25 mol % $Na_2O$;
greater than or equal to 0.1 mol % and less than or equal to 20 mol % $K_2O$;
greater than or equal to 2 mol % and less than or equal to 10 mol % CaO;
greater than or equal to 0 mol % and less than or equal to 10 mol % MgO;
greater than or equal to 0.01 mol % and less than or equal to 0.5 mol % $Fe_2O_3$; and
Au, wherein the concentration of Au in the batch is less than or equal to 0.5 mol % Au,
cooling the molten glass to form a glass article.

16. The method of claim 15, wherein the glass article has an Au retention greater than or equal to 8% when compared to the batch.

17. The method of claim 15, wherein the glass article has an Au retention greater than or equal to 20% when compared to the batch.

18. The method of claim 15, wherein the glass article comprises an average number of Au particles of less than or equal to 5,000 particles/mm$^3$.

19. The method of claim 15, wherein the glass article comprises an average number of Au particles of less than or equal to 1,000 particles/mm$^3$.

20. The method of claim 15, wherein the glass article comprises an average number of Au particles of less than or equal to 500 particles/mm$^3$.

* * * * *

UNITED STATES PATENT AND TRADEMARK OFFICE
CERTIFICATE OF CORRECTION

PATENT NO. : 11,802,072 B2
APPLICATION NO. : 17/843001
DATED : October 31, 2023
INVENTOR(S) : Xiaoju Guo et al.

Page 1 of 1

It is certified that error appears in the above-identified patent and that said Letters Patent is hereby corrected as shown below:

On the Title Page

In item (57), in Column 2, in "Abstract", Line 7, delete "1(20;" and insert -- $K_2O$; --.

On page 2, in Column 2, under "Other Publications", Line 2, delete "Retreived" and insert -- Retrieved --.

On page 2, in Column 2, under "Other Publications", Line 5, delete "Retreived" and insert -- Retrieved --.

On page 2, in Column 2, under "Other Publications", Line 8, delete "Retreived" and insert -- Retrieved --.

On page 2, in Column 2, under "Other Publications", Line 10, delete "Retreived" and insert -- Retrieved --.

On page 2, in Column 2, under "Other Publications", Line 18, delete "Retrieve" and insert -- Retrieved --.

In the Claims

In Column 16, Line 62, in Claim 1, delete "0-2" and insert -- 2 --.

Signed and Sealed this
Twenty-sixth Day of March, 2024

Katherine Kelly Vidal
*Director of the United States Patent and Trademark Office*